United States Patent [19]
Jarvis et al.

[11] Patent Number: 5,870,561
[45] Date of Patent: Feb. 9, 1999

[54] NETWORK TRAFFIC MANAGER SERVER FOR PROVIDING POLICY-BASED RECOMMENDATIONS TO CLIENTS

[75] Inventors: Brian Lee Jarvis, Orem; Jeffrey T. Hawkins, Mapleton, both of Utah

[73] Assignee: Novell, Inc., Orem, Utah

[21] Appl. No.: 619,814

[22] Filed: Mar. 15, 1996

[51] Int. Cl.$^6$ .............. G06F 13/00; G06F 15/16; G06F 3/00

[52] U.S. Cl. ............... 395/200.68; 395/200.69; 395/200.5; 395/200.53; 395/672; 379/220; 379/221

[58] Field of Search ............ 395/200.01, 200.02, 395/200.03, 200.06, 200.09–200.12, 200.15, 200.3–200.34, 200.46–200.5, 200.49–200.56, 200.68–200.72, 672–675; 379/220–221

[56] References Cited

U.S. PATENT DOCUMENTS

| | | | |
|---|---|---|---|
| 4,979,118 | 12/1990 | Kheradpir | 395/200.71 |
| 5,341,477 | 8/1994 | Pitkin et al. | 395/200.56 |
| 5,548,724 | 8/1996 | Akizawa et al. | 395/200.33 |
| 5,557,747 | 9/1996 | Rogers et al. | 395/200.53 |
| 5,581,610 | 12/1996 | Hooshiari | 379/133 |
| 5,583,928 | 12/1996 | Tester et al. | 379/220 |
| 5,598,532 | 1/1997 | Liron | 395/200.5 |
| 5,644,717 | 7/1997 | Clark | 395/200.54 |
| 5,644,768 | 7/1997 | Periwal et al. | 395/672 |

*Primary Examiner*—Parshotam S. Lall
*Assistant Examiner*—Bharat Barot
*Attorney, Agent, or Firm*—Cesari and McKenna, LLP

[57] ABSTRACT

A policy-driven network traffic manager recommends to individual application programs that generate network traffic whether, and optionally under what conditions, they should generate network traffic. The network traffic manager has an interface, through which the application programs, prior to generating network traffic, call the network traffic manager and describe the traffic the application programs propose to generate. A policy repository stores a set of policies, which the network traffic manager uses to ascertain whether the application programs should generate the proposed network traffic. The policies can include considerations such as time, link cost, latency, congestion and availability. The network traffic manager then sends the recommendations to the application programs.

35 Claims, 5 Drawing Sheets

NETWORK TRAFFIC MANAGER SERVER FOR PROVIDING POLICY-BASED RECOMMENDATIONS TO CLIENTS

CROSS-REFERENCE TO RELATED APPLICATIONS

This invention is related to copending U.S. patent application Ser. No. 08/498,640, titled METHOD AND APPARATUS FOR SYNCHRONIZING DATA TRANSMISSION WITH ON-DEMAND LINKS OF A NETWORK, which was filed on Jul. 6, 1995 and assigned to the assignee of the present invention, now U.S. Pat. No. 5,546,574.

BACKGROUND OF THE INVENTION

1. Field of the Invention

The invention relates to network management tools and in particular to network management tools that control communication between nodes of a network.

2. Description of the Related Art

Networks are generally categorized as local area networks (LANs) or wide area networks (WANs). LANs interconnect a relatively small number of nodes in a relatively small geographic area, such as a group of buildings. The nodes of a LAN communicate with each other by exchanging packets of data over media, such as cable, optical fiber or wireless connections, called LAN links. A WAN is a group of LANs interconnected by WAN links. The cost of communicating over a LAN is generally much less than the cost of communicating over a WAN because LAN links are usually privately owned, whereas WAN links are often leased. Once a LAN is installed, its owner generally does not incur an additional cost for sending packets over the LAN, whereas the providers of WAN links charge for each packet sent over the WAN and/or for the time the WAN link is established.

Although network software originally written for use with data transmissions over LANs can be used over WANs, the resulting WAN network traffic is very expensive because of design choices made when the software was written. Software designed for use over LANs generally does not limit the amount of network traffic that it generates because LAN communication costs are small. (Generating network traffic herein means transmitting data over a network and/or causing other software to transmit over the network.) Consequently, this software frequently generates inefficient network traffic. For example, the software does not optimize on network usage by forgoing transmission of so-called "heartbeat" messages or by combining several small packets into one large packet. When such software is used over a WAN, the resulting network traffic is expensive primarily because of the per-packet charges levied by the WAN-link providers.

The following types of software typically generate network traffic: application software, such as word processors and spreadsheet programs that retrieve and store files from file servers and send files to print servers; network applications, such as electronic mail programs that send and receive mail messages; and network operating systems (NOS) and distributed database programs that generate various "housekeeping" messages. Network traffic is also generated in support of other NOS functions, such as name resolution, searching, time synchronization, data synchronization and object reference verification. Software that generates network traffic is hereinafter collectively referred to as application programs.

An example of such an application program is a NetWare system having a distributed, hierarchical database of network information called NetWare Directory Services (NDS). NDS stores replicas of objects and entries on several nodes ("NDS nodes") of a network to increase the accessibility of this information to applications and other software that is distributed across the network. Whenever one of these replicas is changed, these NDS nodes collaborate to synchronize all of the replicas, i.e. the NDS nodes exchange messages with each other to ensure that all of the replicas are updated to reflect the change. Synchronization also ensures that the NDS nodes do not provide inconsistent ("stale") data to the distributed software.

Sometimes, in an effort to achieve a performance objective, application programs inefficiently utilize the network. For example, an objective of NDS is to quickly synchronize replicas. To achieve this goal, NDS avoids the overhead involved in recreating connections between NDS nodes by maintaining open connections even when NDS does not need to send synchronization messages. Such inefficiencies increase network-link costs.

Moreover, the large volume of network traffic generated by application programs often overloads certain network links, particularly during periods of peak usage. This type of overloading may interfere with significant network traffic, such as file server and print server operations. Consequently, some network administrators would prefer to restrict the use of selected network links based on the type and priority of the network traffic serviced over the links. In addition, they would prefer to balance the cost of network traffic against factors, such as the speed of replica synchronization provided by a NOS.

Software developers have attempted to reduce network link charges by identifying the sources of network traffic and reducing the traffic they generate. For example, some application programs allow a network administrator to control the network traffic generated by these programs. However, each of these programs typically has a different user interface and different operating characteristics which the network administrator must learn in order to effectively manage the network traffic generated by the program. This is clearly burdensome. In addition, the network administrator must configure each application program for each node on which the program is installed. This approach also duplicates effort because software to manage network traffic must be developed for each such application program. Furthermore, as new types of network links are developed, software developers must update their application programs to provide options for controlling traffic over these new links.

SUMMARY OF THE INVENTION

The invention comprises a policy-driven network traffic manager (hereinafter referred to as a "server") that provides recommendations to individual application programs (hereinafter referred to as "clients") as to whether, and optionally under what conditions, they should generate network traffic. Prior to generating such traffic, each client provides the server with a description of its proposed traffic. In response to the traffic description the server uses a set of policies to ascertain whether the client should generate the proposed network traffic. The policies can include considerations such as time, link cost, latency, congestion and availability that can either be supplied by a vendor or created (and/or modified) by a network administrator. Preferably the recommendation provided to the client is either a "send" or "do not send" message. If a client receives a "do not send" message, it may queue the message(s) for subsequent transmission or it can forego the transmission completely.

Notably, the recommendations are not mandatory and each client can choose to ignore them as appropriate.

In the illustrative embodiment, the client issues a "call" to the server describing the proposed traffic. The client typically issues one such call for a set of related packets, such as all the packets related to a single file transfer. To avoid repeatedly making even these related-packet calls, the client can optionally include in the calls named parameters such as "at what time should I send the proposed network traffic?"In response to such inquiries, the server calculates a value for each named parameter according to the policies and returns each calculated value to the client; this enables the server to accommodate new traffic types and to provide flexibility to, and handle future expansion needs of, the clients.

Specifically, the server selects an applicable policy from a set of policies for each named call. Policy selections are formulated, in part, by considerations such as: (i) the destination address of the proposed network traffic, (ii) the purpose of the traffic, (iii) the size and number of packets to be sent, (iv) the time of day, (v) the cost of the links involved and (vi) the identity of the client. Furthermore, each policy can apply to a different type of network traffic such as database partitioning, entry replication and time synchronization. The selected policies can vary from prioritizing various types of network traffic to specifying time periods during which some types of network traffic should be deferred or foregone.

Ideally, the selected policy is used to compute behavior specifications for use by the client, such as when (if ever) the proposed traffic should be sent and the kinds of traffic that can be sent along with the proposed traffic. The server computes these specifications based on factors similar to the considerations used to select a policy. For example, since the cost of communicating over a LAN is small, requests to generate LAN traffic are usually granted immediately. On the other hand, the cost of communicating over a WAN might vary with the time of day and the day of the week; accordingly the server can consider time factors when recommending whether to generate WAN traffic. In addition, different segments of a LAN can have different associated costs, which can be measured in monetary or non-monetary terms, e.g. a policy can ascribe a high cost to a particular link to make the link available only to high-priority traffic. Such a high cost causes the network traffic manager to recommend that less important traffic be deferred and, therefore, make more bandwidth available for priority traffic.

Optionally, the server can be notified of changes in the availability of network resources, such as when links start up or shut down. The server can then notify the clients of corresponding changes in the server's recommendations regarding whether or when the clients should generate network traffic. For example, assume the server recommends that a client defer generating network traffic because the priority of the proposed network traffic is low in light of available network bandwidth. Later, if additional bandwidth becomes available because an additional network link starts up, the server can recommend that the client generate the proposed network traffic. For other methods of synchronizing data transmissions over on-demand links, refer to the above-captioned, related U.S. patent application Ser. No. 08/498,640, filed Jul. 6, 1995.

The invention thus provides a single tool by which a network administrator can set policies regarding the generation of network traffic and these policies can then be uniformly applied to all traffic-generating application programs on one or more nodes. Advantageously, the network administrator need learn only one user interface to manage the network traffic generated by many application programs. The policies can be specific to a particular node or they can apply to a group of nodes. In addition, the network administrator can view and change the policies of remote nodes.

Furthermore, the tool is extensible in that policies can be added as new clients or types of network links are installed. The invention also provides a simple mechanism by which application programs can ascertain whether and when the programs should generate network traffic. This mechanism simplifies the design and development of the application programs because each program need not provide a user interface for storing and implementing network traffic policies.

BRIEF DESCRIPTION OF THE DRAWINGS

The above and further advantages of the invention may be better understood by referring to the following description in conjunction with the accompanying drawings, in which.

DESCRIPTION OF THE PREFERRED EMBODIMENT

Figure 1:
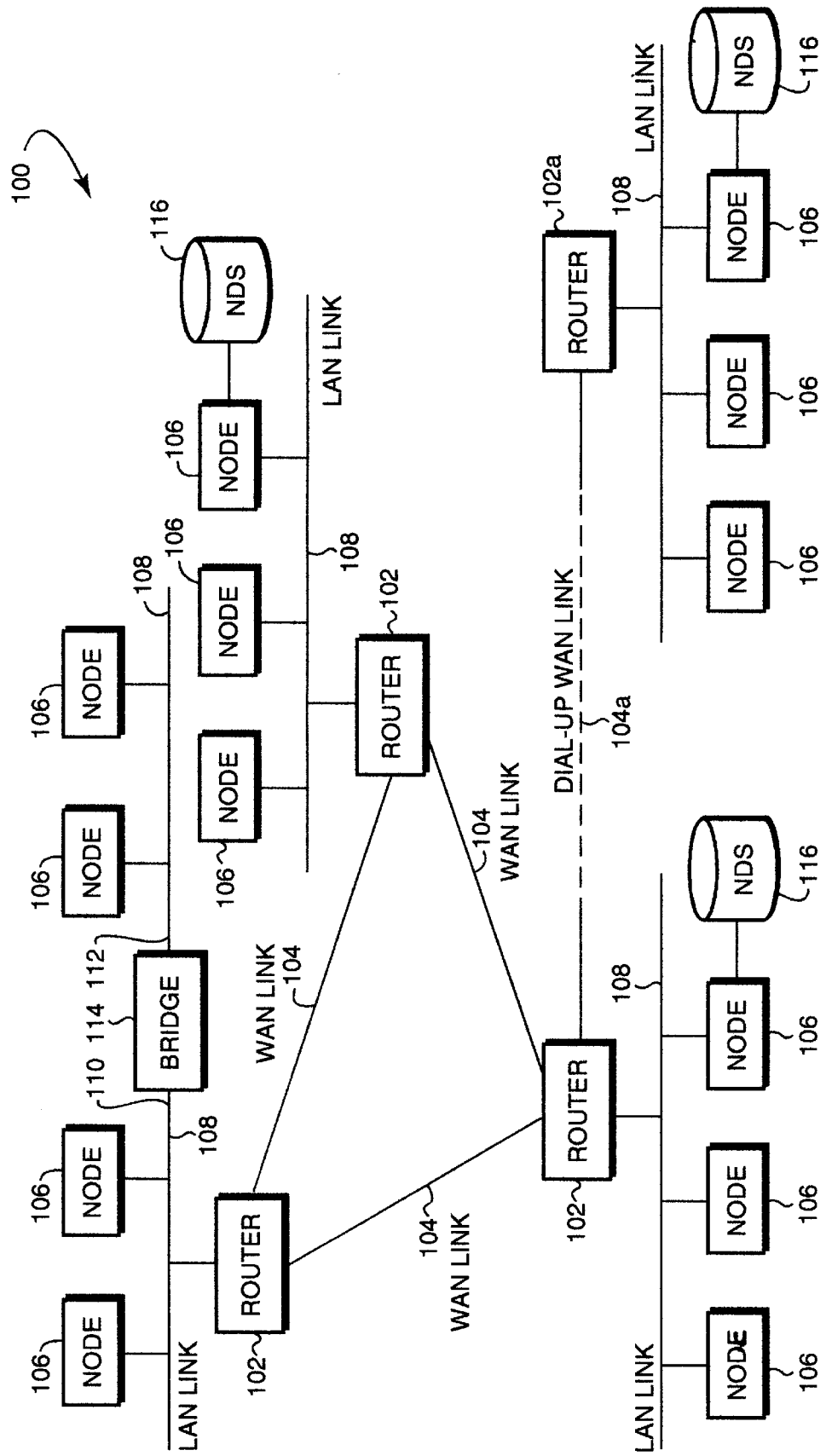
FIG. 1 is a block diagram of a typical network in which the subject network traffic manager can be used.

FIG. 1 is a block diagram of a typical network 100 in which the subject network traffic manager can be advantageously used. The network has routers 102, which are interconnected by WAN links 104, such as leased lines. A router 102a is interconnected to the network 100 by a dial-up WAN link 104a, which can be established and broken on demand. The provider of the dial-up WAN link 104a typically charges for each minute of connect time. The rate might vary with the time of day and day of week that the connection is established and the provider might also impose a minimum charge each time the connection is established. Network nodes 106 are interconnected by LAN links 108 and, through the routers 102 and 102a, by the WAN links 104 and 104a. One LAN is divided into two segments 110 and 112 by a bridge 114 to isolate network traffic on the two sides of the bridge and to reduce the amount of traffic on each segment. Application programs (not shown) executed by the nodes 106 communicate with each other over the network 100. Some nodes 106 store an NDS database 116.

Figure 2:
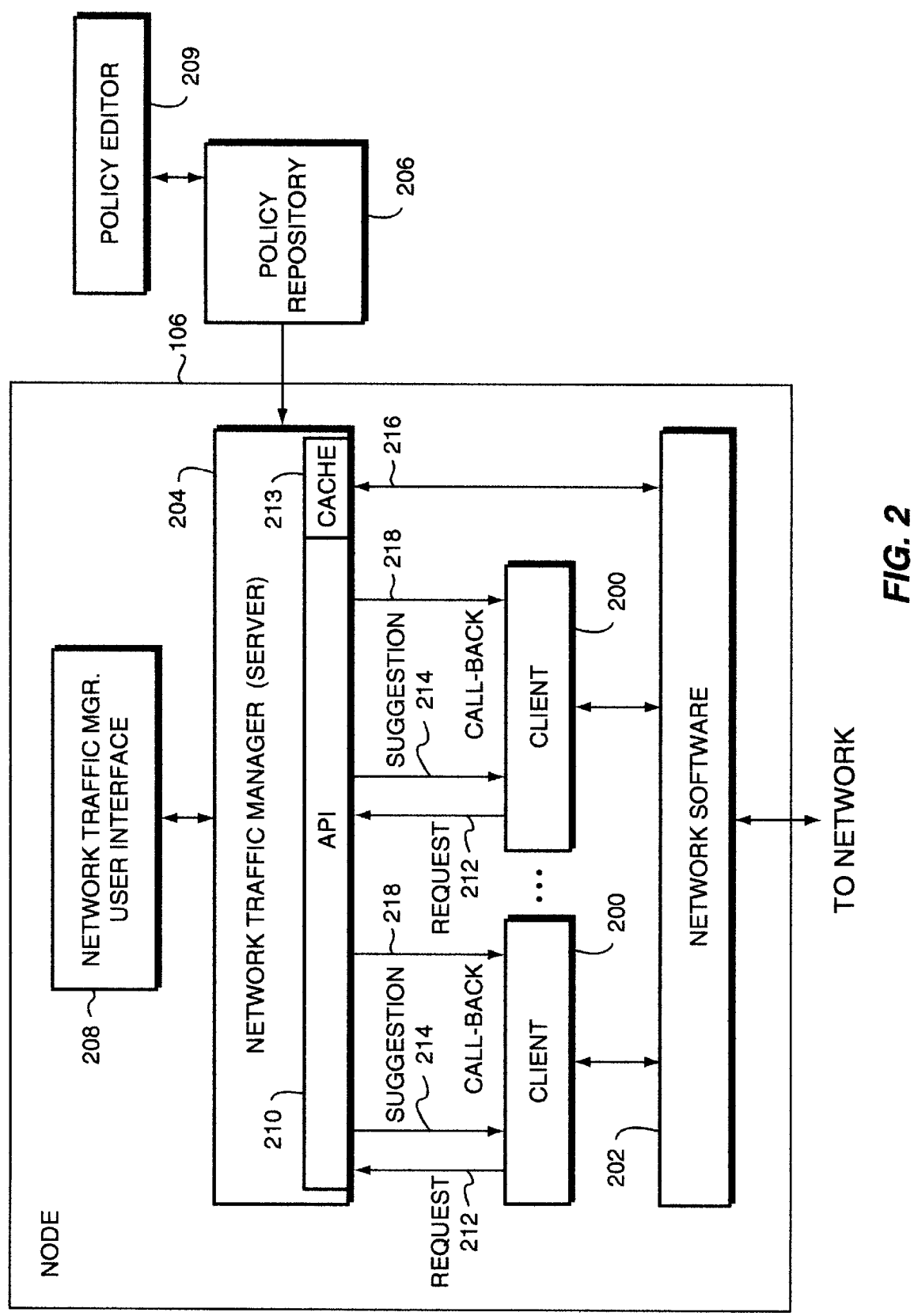
FIG. 2 is a more detailed block diagram of a node of the network of FIG. 1.

FIG. 2 is a block diagram of a portion of a node 106. Clients 200 communicate over the network 100 (FIG. 1) by making requests of network software 202, which typically implements a multi-layered protocol, such as the seven-layered Open System Interconnection (OSI) reference model. A network traffic manager (server) 204 reads a set of policies from a policy repository 206 and has a network traffic manager user interface 208, by which a network administrator can start and stop the server and temporarily disable selected policies. Although the user interface 208 is shown as being executed on the same node as the server 204, the server can communicate over the network 100 with a user interface being executed on a different node (not shown). A policy editor 209 enables the network administrator to view and modify existing policies and enter additional policies.

The server 204 has an application programming interface (API) 210, by which the clients 200 preferably, prior to generating network traffic, make requests 212 and receive recommendation 214 as to whether the clients should generate the proposed network traffic. In each request 212, the client 200 identifies a type of traffic it proposes to generate and a destination node address. (A "destination address" might comprise a list of network addresses, which the network software 202 processes.) The request 212 can also contain optional parameters ("named parameters"). The server 204 communicates with the network software 202 (over line 216) to obtain cost estimates or other characteristics of the link(s) 104, 104a and/or 108 involved in transporting the proposed network traffic to the destination node. The server 204 stores these cost estimates in a cache 213. This cost can be measured in monetary terms, time, or other units. In a well-known manner, the network software 202 selects a route for the proposed network traffic. The network software 202 is thus well equipped to estimate the cost of the traffic, however other mechanisms can be used to estimate this cost. In accordance with the invention, the server 204 uses policies to form a recommendation as to whether the client 200 should generate the proposed traffic and then the server sends the recommendation 214 to the client.

Figure 3:
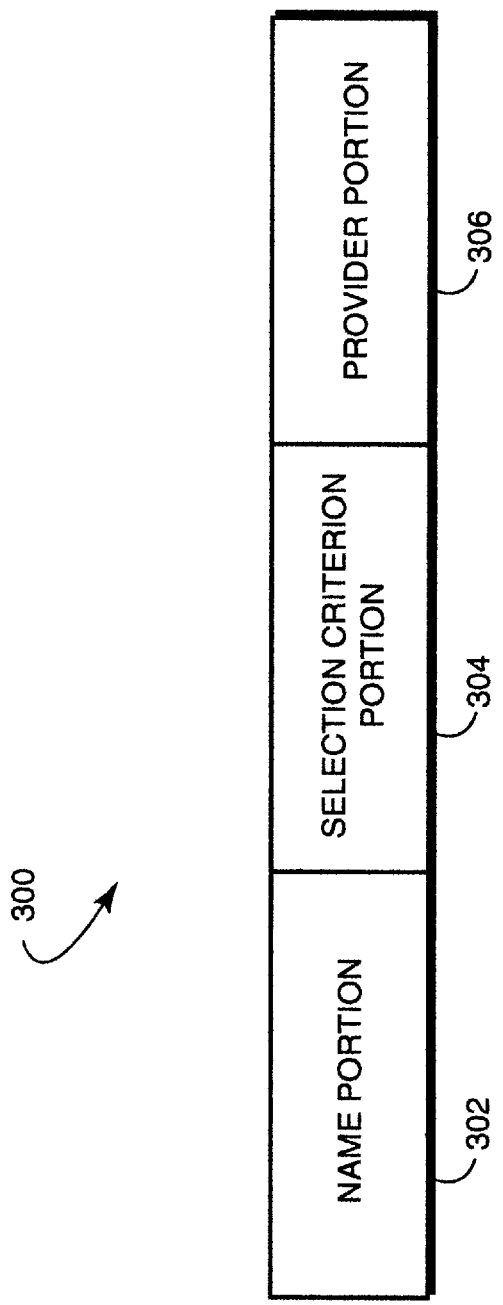
FIG. 3 is a block diagram of a policy implemented by the network traffic manager.

As shown in FIG. 3, a policy 300 has a name portion 302, a selection criterion portion 304 and a provider portion 306. The name 302 identifies the policy. The selection criterion portion 304 contains control information, such as formulas, by which the server 204 ascertains whether the policy applies to a request 212 (FIG. 2) from a client 200. The provider portion 306 also contains control information, such as formulas, that enables the server 204 to form a recommendation as to whether the client 200 should generate the proposed network traffic and to calculate values for the optional parameters (if any) sent by the client 200. The formulas make use of factors and considerations that include, but are not limited to, source address, destination address, source LAN area, destination LAN area, link-up cost, link open cost, link packet cost, link throughput, traffic type, timetables and expected packet count.

Figure 4A:
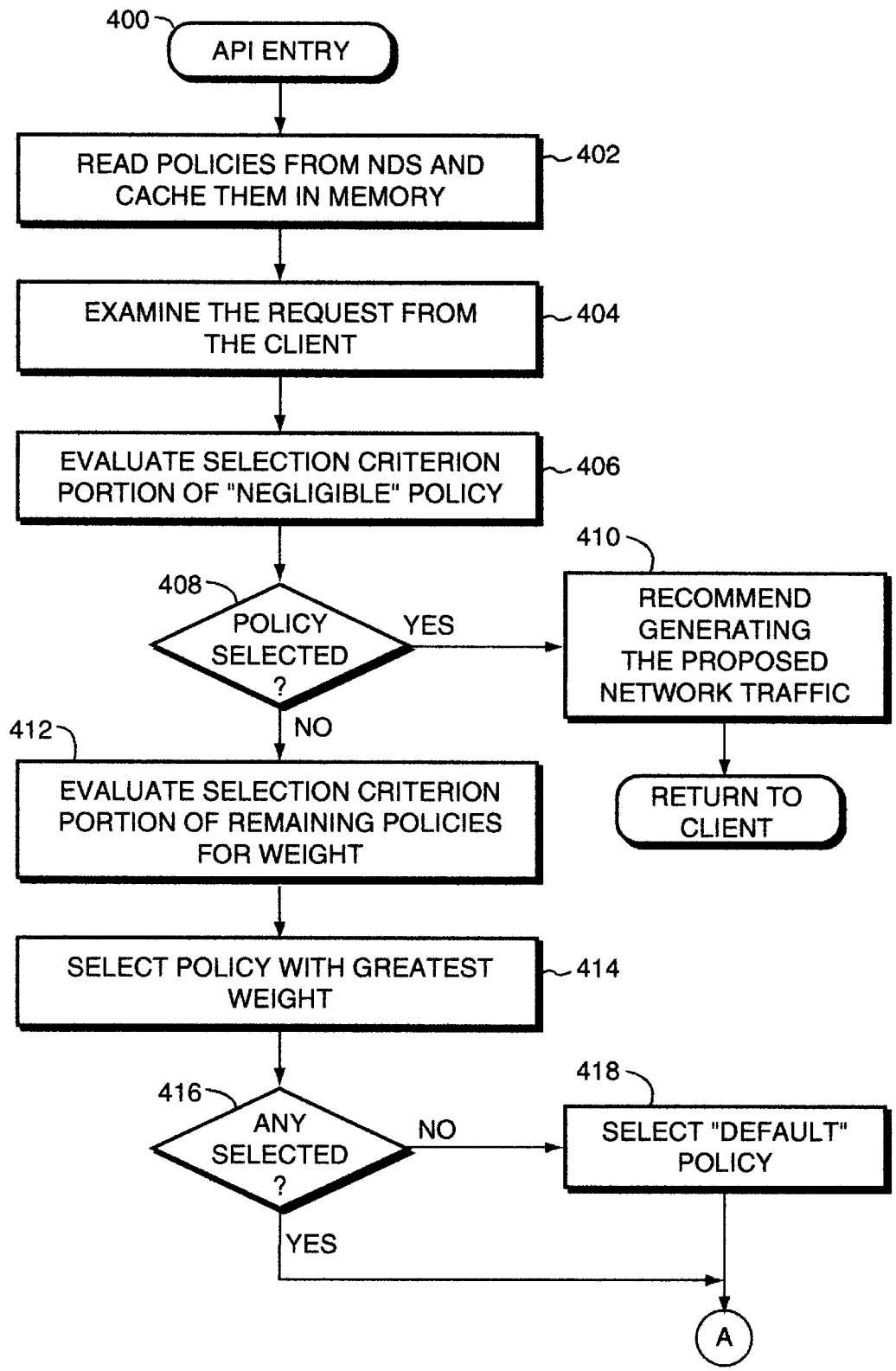
FIG. 4 is a flowchart that depicts the operation of the network traffic manager.
Figure 4B:
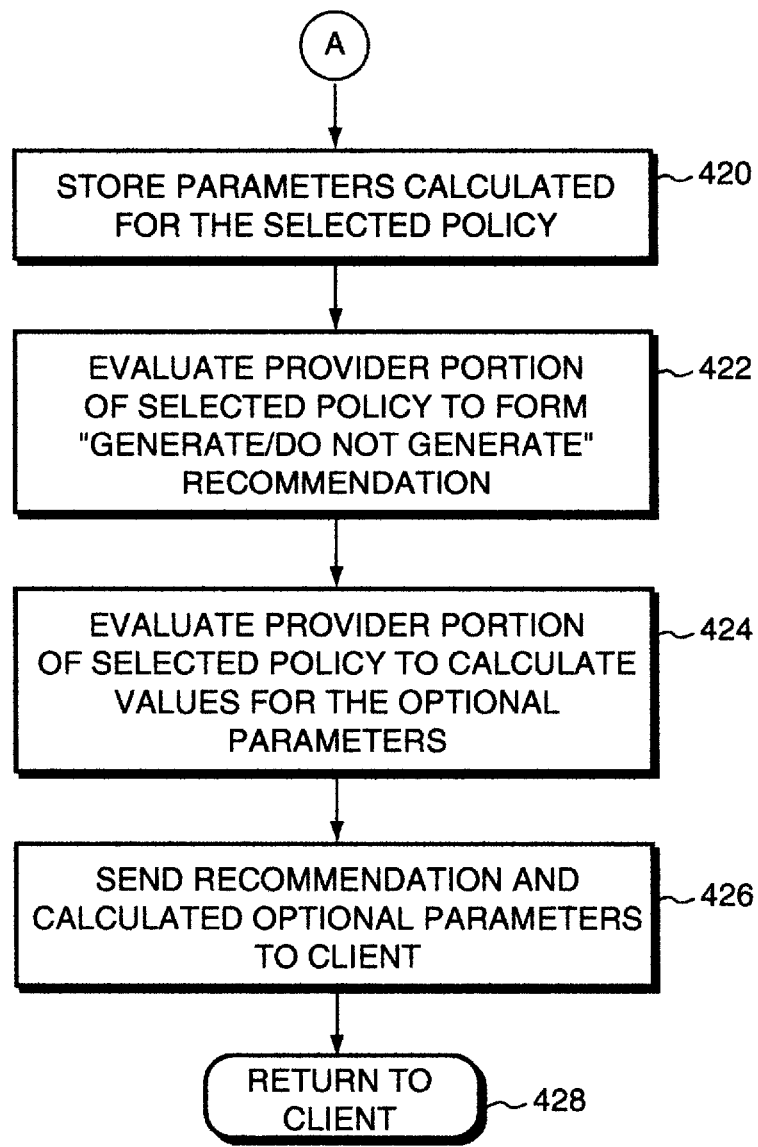

FIG. 4 is a flowchart that depicts the operation of the server 204. The server 204 is multi-threaded and the flowchart depicts the operation of one thread, however each of a plurality of threads can perform these steps. At step 400, the server 204 receives an API call from a client 200 and at step 402 it reads a set of policies from the policy repository 206. Preferably, the policy repository 206 stores the policies in a textual NDS entry, such as in the NDS database 116 (FIG. 1), however any persistent storage mechanism, such as a conventional disk file or database, can be used. Furthermore, one repository 206 can service several servers 204. Such a shared repository 206 facilitates managing the policies because it provides a single point of control over policies that affect several servers. In addition, NDS controls access to the policies and so provides security against unauthorized tampering.

The server 204 parses the policies and stores, i.e. "caches," them in memory, preferably in an expression tree, for faster access, although the policies can be stored using other mechanisms, such as tables or lists. In the preferred embodiment the policies are stored as interpretable code and the server 204 interprets the policies. The ability to augment and change the policies through the policy editor 209, together with the interpretation of the policies by the server 204, makes the policies easily extendible. Alternatively, the server 204 can store partially or fully compiled policies, e.g. as tokens, interpreted byte codes or binary executable code. For example, storing policies that are written in the Java language, i.e. as Java byte codes, makes the policies independent of the hardware architecture on which the server 204 is executed. These alternatives occupy less space in the policy repository 206 and can be faster to execute or interpret, but they require a compiler. (Java also requires a virtual machine on the server 204.) Optionally, the server 204 can store the policies completely within itself, i.e. as part of its executable image and not in a separate file or database, however this alternative makes it difficult to modify or add policies.

At step 404, the server 204 examines the request 212 (FIG. 2) from a client 200. The request 212 identifies the type of network traffic that the client 200 proposes to generate. Table 1 lists several examples of traffic types, although additional traffic types can be dynamically added. The traffic types are defined in an NDS schema, such as in the NDS database 116 (FIG. 1). Each client 200, or alternatively a program that installs the client, defines new traffic types in the NDS entry as needed, such as when new clients or types of network links are installed. Upon startup, the server 204 reads the traffic type definitions

TABLE 1

Network Traffic Types

| Traffic Type Name | Code |
|---|---|
| NDS_HighPrioritySynch | 0 |
| NDS_MediumPrioritySynch | 1 |
| NDS_LowPrioritySynch | 2 |
| NDS_SynchHeartbeat | 3 |
| NDS_EntryHeartbeat | 4 |
| NDS_BacklinkCheck | 5 |
| NDS_PurgeCheck | 6 |
| NDS_JanitorCheck | 7 |
| TS_TimeCheck | 8 |
| GW_HighPriorityMail | 9 |
| GW_LowPriorityMail | 11 |
| GW_BusySearch | 12 |

For each request 212, the server 204 selects a policy that applies to the request. The policies are stored in NDS objects that represent LAN areas and in objects that represent servers, although other tree-structured and non-tree-structured arrangements can be used. The server-object policies only apply to the corresponding server and are examined first. The LAN area-object policies apply to the entire LAN area and are examined second, but only if no applicable policy is found in the server-object. Thus, a network administrator can define policies that apply to an entire LAN and can selectively override these policies on a per-server basis.

First, at step 406, the server 204 evaluates the selection criterion portion 304 (FIG. 3) of the policy whose name 302 is "NEGLIGIBLE," which represents traffic that would incur a negligible cost to transfer. For example, traffic destined to the same node on which the client is being executed would incur negligible costs. In addition, if the network administrator considers the cost of carrying network traffic over a LAN link 108 to be negligible, the network administrator would modify the selection criterion portion 304 of the NEGLIGIBLE policy to encompass all LAN traffic. Alternatively, selected LAN segments, such as segment 112, might have a high cost associated with them to reduce traffic destined to those segments.

If the proposed traffic matches the selection criterion portion 304 of the NEGLIGIBLE policy, at step 408 the server 204 selects the NEGLIGIBLE policy and at step 410 it recommends that the proposed traffic be generated. Otherwise, at step 412 the server calculates a "weight" for each policy by evaluating the selection criterion portions of the remaining policies. At step 414, the server 204 selects the policy having the greatest weight, however if none of the policy weights exceed a predetermined threshold, at steps 416–418 the server 204 selects the policy named "DEFAULT."

At step 412, the server 204 calculated values for various parameters, such as the cost of generating the proposed traffic. After selecting the policy with the greatest weight (or the "DEFAULT" policy) at steps 414–418, at step 420 the server stores the parameter values calculated for the selected policy.

At step 422, the server 204 evaluates the provider portion 306 (FIG. 3) of the selected policy to form a recommendation as to whether the client 200 should generate the proposed network traffic. In addition, at step 424, for each optional parameter (if any) that the client 200 sent to the server 204, the server calculates a value according to control information from the provider portion 306 of the selected policy. These calculations can make use of the parameter values calculated in steps 412 and 424. Optionally, in certain policies, the network administrator might consider some parameters unimportant and, therefore, not provide the control information necessary to calculate these parameters. In this case, the server 204 simply ignores these parameters. At step 426, the server 204 sends the calculated values for the parameters and the recommendation 214 (FIG. 2) to the client 200 and then returns control to the client 200 at step 428.

The server interface (API 210) allows a client 200 to include an optional address of a call-back routine along with the request 212. If the client sends the address of a call-back routine and the server 204 sends a recommendation 214 that the client 200 should not generate the proposed network traffic, the server stores the address of the call-back routine. The policies can define events, the occurrence of which causes the server 204 to call the call-back routine 218 and thus recommend to the client 200 that the client generate the proposed network traffic. The request 212 can also include parameters to be calculated and passed along with the call to the call-back routine. For example, to minimize the startup charges associated with establishing the dial-up WAN link 104a, the server can recommend that all traffic to be carried over the dial-up WAN link should not be sent, which would cause the clients 200 to queue all such proposed traffic. The network software 202 can notify 216 the server 204 when the dial-up WAN link is established and the server can then call the call-back routines 218 and thus recommend that clients 200 generate the traffic over the dial-up WAN link 104a. Thus, once the dial-up WAN link is established, all the queued network traffic is sent.

Alternatively, the server 204 can count the number of clients 200 that propose generating network traffic over the dial-up WAN link and then, when the count reaches a predetermined threshold, the server can call the call-back routines 218. The server 204 can optionally request that the network software 202 start an additional link when a backlog of requests occurs or traffic volume reaches a level that justifies starting up an on-demand link. For other methods of synchronizing data transmissions over on-demand links, refer to the above-captioned, related U.S. patent application Ser. No. 08/498,640, filed Jul. 6, 1995, now U.S. Pat. No. 5,546,574.

It will therefore be seen that we have developed a network traffic manager, which can be utilized with a variety of networks, operating systems and clients. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, the server interface can be any interprocess communication mechanism and need not be an API. Furthermore, the server can estimate cost and other characteristics of the link(s) involved in carrying the proposed network traffic.

We claim:

1. A network traffic manager (server) for providing policy-based recommendations to application programs (clients) capable of generating network traffic, the server comprising:
   (a) an interface for receiving requests from the clients, each request associated with a proposed generation of network traffic by one of the clients, each request comprising at least one required parameter that describes type of network traffic that the requesting client proposes to generate and also comprising at least one optional parameter that inquires as to whether said proposed generation should be postponed and automatically initiated by the requesting client at a future time if at all;
   (b) means for forming a recommendation relating to whether the requesting client should generate the proposed network traffic, the recommendation based on one or more policies that include the required and optional parameters received from the requesting client, said recommendation including indication as to whether or not said proposed generation should take place, and if said indication indicates that said proposed generation should not take place, then said recommendation also includes a further indication as to whether said proposed generation should take place at said future time; and
   (c) means for providing the recommendation to the requesting client.

2. A network traffic manager (server) for providing policy-based recommendations to application programs (clients), each client occasionally generating network traffic, the server comprising:
   (a) an interface for receiving requests from the clients, each request associated with a proposed generation of network traffic by one of the clients, each request comprising at least one required parameter that describes the proposed generation of network traffic by the requesting client;
   (b) means for storing a set of policies, each policy comprising:
      (i) at least one selection criterion and
      (ii) associated control information; and
   (c) a policy selector responsive to each request for:
      (i) selecting one policy from the set of policies, the policy selection based on the at least one required parameter received from the requesting client and the at least one selection criterion of the selected policy;
      (ii) forming, according to the control information associated with the selected policy, a recommendation as to whether network traffic should be generated; and
      (iii) providing the recommendation to the requesting client;
   wherein each said request also includes a further recommendation request from the requesting client to the server that if the recommendation provided to the requesting client at step (c)(iii) indicates that network traffic should not be generated, said server should automatically inform the requesting client at a future time via a further recommendation when said network traffic should be generated said further recommendation causing said requesting client to automatically initiate network traffic previously queued at said requesting client.

3. The server defined in claim 2, wherein:
   (i) the interface for receiving requests from the clients comprises means for receiving one or more optional parameters with each request from a requesting client;
   (ii) the policy selector calculates, according to the control information associated with the selected policy, a value for each optional parameter received from the requesting client; and
   (iii) the policy selector sends each calculated value for each optional parameter to the requesting client.

4. The server defined in claim 2, further comprising means for detecting an event and, responsive to the event, for sending to at least one of the requesting clients a recommendation that network traffic should be generated.

5. The server defined in claim 4, wherein the network traffic is carried over network links and wherein the event is a change in status of at least one of the network links.

6. The server defined in claim 5, wherein the change in status is a startup of the at least one of the network links.

7. The server defined in claim 4, wherein:
   (i) the server further comprises a counter, the policy selector incrementing the counter when the policy selector provides a recommendation that one of the requesting clients should not generate network traffic and (ii) wherein the event occurs when the counter exceeds a predetermined value.

8. The server defined in claim 2, further comprising a policy editor for altering one of the policies in the means for storing a set of policies.

9. The server defined in claim 2, wherein the control information associated with at least one policy comprises at least one formula.

10. The server defined in claim 2, wherein the control information associated with at least one policy comprises machine-code instructions.

11. The server defined in claim 2, wherein the control information associated with at least one policy comprises byte-code instructions.

12. The server defined in claim 2, wherein the control information associated with at least one policy comprises object-code instructions.

13. The server defined in claim 2, wherein the control information associated with at least one policy comprises source-code instructions.

14. The server defined in claim 2, wherein the means for storing a set of policies comprises a table.

15. The server defined in claim 2, wherein the means for storing a set of policies comprises a textual entry in a database.

16. The server defined in claim 2, wherein the means for storing a set of policies comprises a distributed, hierarchical database.

17. The server defined in claim 16, wherein the distributed, hierarchical database is NetWare Directory Services (NDS).

18. The server defined in claim 2, wherein the means for storing a set of policies comprises an expression tree.

19. The server defined in claim 2, wherein the interface for receiving requests is a application programming interface (API).

20. The server defined in claim 2, wherein the at least one required parameter received from the requesting client comprises:
   (i) a type of network traffic the requesting client proposes to generate and
   (ii) a destination address to which the requesting client proposes to send the network traffic.

21. A network traffic manager (server) for providing policy-based recommendations to application programs (clients), the clients occasionally generating network traffic, the server comprising:
   (a) an interface for receiving requests from the clients, each request associated with a proposed generation of network traffic by one of the clients, each request comprising at least one required parameter that describes the proposed generation of network traffic by the requesting client and also comprising a further parameter that inquires as to whether said proposed generation should be postponed and automatically commenced by said requesting client at a future time, if at all;
   (b) means for storing a set of policies, each policy comprising:
      (i) at least one selection criterion and
      (ii) an associated recommendation as to whether network traffic should be generated and if said network traffic should not be generated, whether said network traffic should take place at said future time; and
   (c) a policy selector responsive to each request, for:
      (i) selecting one policy from the set of policies, the policy selection based on at least the at least one required parameter received from the requesting client and the at least one selection criterion of the selected policy; and
      (ii) providing the recommendation associated with the selected policy to the requesting client.

22. A network traffic manager (server) for providing policy-based recommendations to application programs (clients), the clients occasionally generating network traffic, the server comprising:
   (a) an interface for receiving requests from the clients, each request associated with a proposed generation of network traffic by one of the clients, each request comprising at least one required parameter that describes the proposed generation of network traffic by the requesting client;
   (b) means for calculating a cost of the proposed generation of network traffic, the calculation based on a policy that includes the at least one required parameter received from the requesting client; and
   (c) a recommendation generator responsive to each request, for:
      (i) comparing the calculated cost with a predetermined value;
      (ii) when the calculated cost is less than the predetermined value, providing the requesting client a recommendation that the proposed network traffic should be generated; and
      (iii) when the calculated cost is greater than the predetermined value, providing the requesting client a recommendation that the proposed network traffic should not be generated at present time, but that said proposed network traffic should be automatically queued at said present time and initiated by said requesting client at a future time specified in the recommendation.

23. The server defined in claim 22, wherein the predetermined value depends on at least a portion of the at least one required parameter received from the requesting client.

24. The server defined in claim 23, wherein the at least one required parameter received from the requesting client comprises:
   (i) a type of network traffic the requesting client proposes to generate and
   (ii) a destination address to which the requesting client proposes to send the network traffic.

25. A method of controlling network traffic generated by an application program (client), comprising the steps of:
   sending a request to a network traffic manager, said request being associated with a proposed generation of network traffic by the node and comprising at least one required parameter that describes the proposed generation of network traffic, wherein said request is sent to the network traffic manager prior to generating the associated network traffic; and
   receiving at said client a recommendation in response to said request, wherein said recommendation relates to whether the associated proposed network traffic should be generated and if said associated proposed network traffic should not be generated said recommendation also specifying a future time at which said associated proposed network traffic should be automatically generated.

26. The method of claim 25, wherein said step of sending includes the step of
   sending one or more optional parameters with said request; and wherein said step of receiving includes the step of
   receiving, with each recommendation, a calculated value for each optional parameter sent with the corresponding request.

27. The method of claim 26, further comprising the step of selecting whether to generate associated proposed network traffic in response to said recommendation.

28. The method of claim 26, further comprising the step of utilizing at least one of the calculated values to select said future time at which to generate the associated proposed network traffic.

29. The method of claim 25, further comprising the step of receiving recommendations from the network traffic manager in response to an event detected by the network traffic manager, wherein said recommendation indicates whether the node should generate the proposed network traffic.

30. The method of claim 29, wherein said step for receiving recommendations from the network traffic manager in response to an event detected by the network traffic manager is associated with a link start up.

31. The method of claim 25 wherein said at least one required parameter comprises information indicative of:
   a type of proposed network traffic to be generated; and
   a destination address to which the proposed network traffic is to be sent.

32. The method of claim 26 wherein said step of sending a request includes a step of performing an application programming interface (API) call to an API associated with the network traffic manager.

33. A method of managing network traffic at a node connected to a computer network, the method comprising the steps of:
   generating a request associated with a proposed generation of network traffic by the node, wherein said request includes at least one parameter indicator of the type of traffic to be generated by the node;
   receiving said request, and forming a recommendation by comparing said request against a set of policies and setting said recommendation in response to comparing said request against said set of policies, said recommendation relating to whether the associated proposed network traffic should be generated and if said associated proposed network traffic should not be generated, said recommendation also specifying a future time at which said associated proposed network traffic should be automatically generated; and
   evaluating said recommendation to determine whether to generate the network traffic.

34. A method of controlling network traffic generated by an application program (client) executing in a processing node connected to a computer network and capable of generating network traffic on the computer network, comprising the steps of:
   generating a request associated with a proposed generation of network traffic by the node to the computer network, wherein said request includes at least one parameter indicative of the type of traffic to be generated by the node;
   receiving said request and forming an initial recommendation indicative of whether the network traffic should be transmitted; and
   evaluating said initial recommendation to determine whether to generate the network traffic;
   wherein if said initial recommendation indicates that said network traffic should not be generated, said method further comprises the steps of automatically forming another recommendation at a future time when said network traffic should occur and automatically initiating said network traffic in response to said another recommendation.

35. The method of claim 34, wherein said step of forming said initial recommendation further comprises the steps of:
   comparing said request against a predefined set of policies; and
   setting said initial recommendation in response to comparing said request against said predefined set of policies.

* * * * *